United States Patent [19]

Bartmann et al.

[11] Patent Number: 4,626,585

[45] Date of Patent: Dec. 2, 1986

[54] METHOD OF PRODUCING A POLYPHENYLENE ETHER PROTECTED AGAINST MOLECULAR WEIGHT DEGRADATION, WHERE THE COPPER SALT EMPLOYED IN THE COUPLING REACTION CAN BE REUSED

[75] Inventors: Martin Bartmann, Recklinghausen; Klaus Burzin, Marl, both of Fed. Rep. of Germany

[73] Assignee: Chemische Werke Huls AG, Marl, Fed. Rep. of Germany

[21] Appl. No.: 732,737

[22] Filed: May 10, 1985

[30] Foreign Application Priority Data

May 25, 1984 [DE] Fed. Rep. of Germany ....... 3419604
Nov. 17, 1984 [DE] Fed. Rep. of Germany ....... 3442141

[51] Int. Cl.$^4$ .......................................... C08G 65/38
[52] U.S. Cl. .................... 528/212; 528/214; 528/215; 528/217; 528/492
[58] Field of Search ............... 528/212, 214, 215, 217, 528/492

[56] References Cited

U.S. PATENT DOCUMENTS

| | | | |
|---|---|---|---|
| 4,404,359 | 9/1983 | Naarmann et al. | 528/216 |
| 4,463,164 | 7/1984 | Dalton et al. | 528/212 |
| 4,482,705 | 11/1984 | Hambrecht et al. | 528/486 |
| 4,537,948 | 8/1985 | Bartmann et al. | 528/215 |
| 4,556,699 | 12/1985 | Bialy et al. | 528/215 X |

*Primary Examiner*—Lucille M. Phynes
*Attorney, Agent, or Firm*—Oblon, Fisher, Spivak, McClelland, & Maier

[57] ABSTRACT

The invention relates to a method for producing a polyphenylene ether, in which the oxidative coupling reaction of a di-ortho-substituted phenol is carried out in a solvent comprised of a chlorinated hydrocarbon, an aromatic solvent, or a mixture of one of these solvents with an alcohol or ketone. The reaction is terminated by removing or using up the oxygen-containing reaction gas, adding hydrazine to the reaction mixture, and filtering out the resulting precipitate. The precipitate may be reused along with a suitable amine, to comprise a catalyst for a subsequent oxidative coupling reaction.

21 Claims, No Drawings

METHOD OF PRODUCING A POLYPHENYLENE ETHER PROTECTED AGAINST MOLECULAR WEIGHT DEGRADATION, WHERE THE COPPER SALT EMPLOYED IN THE COUPLING REACTION CAN BE REUSED

BACKGROUND OF THE INVENTION

1. Field of the Invention:

The present invention relates to a method of producing polyphenylene ethers protected against molecular weight degradation and reuse of the copper salts employed in the coupling reaction.

2. Description of the Prior Art:

Polyphenylene ethers and various methods for producing these are known. For example, see Buehler, 1978, "Specialty plastics" pub. Akademiverlag, Berlin and U.S. Pat. Nos. 3,306,874 and 3,306,875.

The industrial process based on oxidative coupling of di-ortho-substituted phenols by means of copper-amine complexes in the presence of oxygen or oxygen-containing gas mixtures has proven commercially successful. Three steps are necessary to produce the pulverulent end product with such processes; namely (1) termination of the polycondensation, (2) purification of the polymer, and (3) isolation of the polyphenylene ether.

The polycondensation may be terminated by alternate means: inactivation of the catalyst, removal of the catalyst, or removal of the polymer. These measures are characterized in that, although they terminate the polycondensation, an incomplete purification of the polymer results.

The most important methods of purification of the polymer are the following.

1. Addition of aqueous acids.
2. Addition of alkalis.
3. Addition of copper ions complexing agents.
4. Addition of polar solvents for separating out the polymers.

The addition of aqueous acid solutions is possibly the most frequently used technique for terminating the polycondensation, even though the amount of acid consumed is substantial, and the degree of amine separation or removal is inadequate (see German OS No. 22 46 552, p. 4 lines 1 to 8). An improvement of this technique (German OS No. 21 05 372) consists of using an extraction apparatus, e.g. a countercurrent apparatus with the reaction liquor flowing in one direction and an aqueous acid solution flowing countercurrent to it with the further possibility of using elevated temperature conditions. With this improvement, however, large amounts of alkali metal hydroxides are required to recover the amines.

According to the method described in German OS No. 22 46 552, the polyphenylene ether reaction mixture, containing the copper-amine catalyst and the polymer in an aromatic solvent, is terminated by treatment with $CO_2$ and water. The quenched reaction mixture is then processed to isolate the product. The degree of separation of the amine from the polymer is inadequate with this process however.

In German OS No. 15 70 683, the addition of a 50% NaOH solution to the polyphenylene ether reaction mixture is described. This technique has not proven economically feasible, however, because it does not interrupt the polymerization reliably (see German OS No. 24 30 130).

Alternatively, the catalyst can be inactivated and the copper separated out, with the aid of chelating agents (see German Pat. No. 1,570,683, col. 15 lines 3–5; and German OS No. 26 40 147). Additional experimental details for this method may be obtained from German OS No. 23 64 319. The basic drawback of all known methods based on chelating agents is however polymer degradation polymer. It has been established (see German OS No. 27 54 887) that polyphenylene ethers decompose more rapidly the higher the temperature to which they are exposed and the longer the time elapsing between the end of the reaction and polymer isolation. For example, the viscosity index lwhich is an indication of the mean molecular weight of the polymer units) decreases typically by more than 0.1 dl/g per hour, often by as much as 0.2 dl/g/hr (German OS No. 27 54 887).

The use of special chelating agents, e.g. polyamines in the process of Ger. OS No. 24 60 323, has not been able to eliminate this decomposition.

It has been proposed to add additional stabilizing agents to the polymer solutions in addition to the chelating agents. Such proposed agents include, e.g., dihydroxybenzenes, reducing agents (see German OS No. 27 54 887 and German Pat. No. 2,616,746) or aromatic amines (see German OS No. 27 55 937). These solutions, however, cannot yield satisfactory results, because the adjuvants must be supplied in fairly large amounts. Additionally, these adjuvants make it much more difficult to isolate the polyphenylene ether product.

The polyphenylene ether condensation can also be terminated and the polymer precipitated out with the aid of alcohols, ketones, or aqueous solutions of alcohols and/or ketones. These are referred to collectively as "antisolvents". With this technique residues of catalyst and phenoquinones remain behind in the solvent, but small amounts of copper are carried along with the polymer. These small amounts of copper have a detrimental effect on the color of the polymer and in addition catalyze polymer decomposition (see German OS No. 26 16 746).

A common drawback of all the precipitation methods (see, e.g., German OSs Nos. 12 65 410, 25 32 477, 25 32 478, 26 55 161, and 27 52 867) is that substantial amounts of solvents must be employed, processed, and redistilled. Accordingly, it has been proposed that the polymer be recovered by a so-called direct isolation technique, e.g. steam stripping, spray drying, or hot water comminution with filtration. However a precondition for the use of these techniques is that residues of the copper catalyst and other impurities be substantially quantitatively removed prior to the direct isolation stage (see German OS No. 24 60 323).

Finally, according to the prior art the polyphenylene ether reaction can be terminated by simultaneous treatment with a dihydroxybenzene or benzoquinone and a mild reducing agent, e.g. hydrazine (see German Pat. No. 2,430,130). It may be seen from this reference that the resulting polymer does not suffer a reduction in molecular weight after one day. If used alone, the reducing agent is ineffective however. Thus, e.g., if hydrazine in a 30-fold molar excess is used to terminate the reaction, the viscosity of the product decreases from 0.61 to 0.44 dl/g after one day (see ibid., Table I, Test 7). However, when the technique described is employed, the polymer does not suffer from a reduction in molecular weight but the added dihydroxybenzenes or benzoquinones become a hindrance, since they are difficulty biodegradable (see German OS No. 27 54 887).

Another fundamental drawback of all known methods of producing polyphenylene ethers is the fact that the catalyst is irretrievably broken down in the reaction work-up. As a rule, complex and costly process steps are needed to refine the precipitated copper residues and convert them back to active catalyst form. Such steps are, e.g., extraction with a chelating agent, precipitation as the sulfide, conversion to the oxide, and dissolution in hydrobromic acid. An alternative possibility, also costly, is to electrolytically separate the copper salt from the termination solutions which are aqueous acid solutions, aqueous alkali solutions, or chelating agent-containing solutions, and then to convert the recovered copper material to reusable copper salts.

Therefore, there continues to exist a strong need for a method producing polyphenylene ethers protected from molecular weight degradation. There also continues to exist an also strong need for a method for producing polyphenylene ethers where the copper catalyst used in the coupling reaction can be easily reused.

SUMMARY OF THE INVENTION

Accordingly, one object of this invention is to provide a method for producing polyphenylene ethers protected from molecular weight degradation.

It is another object of this invention to provide a method for producing polyphenylene ethers where the copper catalyst used in the coupling reaction is easily reused.

It is another object of this invention to provide a method for producing polyphenylene ethers protected from molecular weight degradation, and where the copper catalyst used in the coupling reaction is easily reused.

It is another object of this invention to provide a method for producing polyphenylene ethers wherein the oxidative coupling reaction is terminated by the addition of only a single agent.

It is another object of this invention to provide a method for producing polyphenylene ethers wherein the oxidative coupling reaction is terminated by the addition of only a single agent, and where the resulting polymer can be protected against degradation of molecular weight.

It is another object of this invention to provide a method to produce a polyphenylene ether polymer substantially free of catalyst residues and by-products.

It is another object of this invention to provide a method to produce a polyphenylene ether product where the residues of copper and quinone in the polymer are reduced to about <2 ppm and about <20 ppm, respectively.

It is another object of this invention to provide a method for producing a polyphenylene ether product free of spurious color imperfections so that the product can be directly sent to a direct isolation process.

It is another object of this invention to provide a method for producing polyphenylene ethers where the catalyst can be isolated directly, where there is no need for separating the catalyst from an aqueous phase (e.g., by precipitation as an insoluble metal sulfide), as there is in a number of the prior art processes.

These and other objects of this invention have been surprisingly found to be met by the discovery that a polyphenylene ether condensation can be effectively terminated if the polycondensation is carried out in a specific solvent mixture, and then, when the desired degree of polymerization is attained, the polyphenylene ether reaction liquor is purged of oxygen to the extent possible, hydrazine is added, and the resulting precipitate is separated out.

It has been surprisingly found that the precipitate resulting from the above method can be used in subsequent, further polycondensation reactions without any detectable loss of activity. This is particularly surprising since according to the state of the art it is not possible to reuse copper salts once they have been used in such a reaction.

DETAILED DESCRIPTION OF THE PREFERRED EMBODIMENTS

The present invention relates to a method for producing polyphenylene ethers protected from molecular weight degradation by quenching the oxidative coupling reaction of di-ortho-substituted phenols and separating out the copper components. The recovered copper catalyst can be used in subsequent, further polycondensation reactions without detectable loss of activity.

This method is characterized by the following:

(1) The reaction medium of the oxidative coupling reaction comprises:
  (a) A $C_1$ to $C_4$ chlorinated hydrocarbon which may be linear or branched;
  (b) a $C_6$ to $C_8$ aromatic solvent; or
  (c) a mixture of (a) or (b) and either a $C_1$ to $C_6$ alcohol, a $C_1$ to $C_6$ ketone or a mixture of these, wherein the alcohol and the ketone may be linear or branched, and wherein the volumeric ratio of (a) or (b) to alcohol or ketone is from 92.7:7.5 to 50:50, and wherein during the oxidative coupling reaction, the polyphenylene ether substantially remains in solution.

(2) The oxygen required for the coupling reaction is essentially removed or used up.

(3) Hydrazine or a hydrazinic solution is added to the reaction mixture.

(4) The resulting precipitate is separated out.

The oxygen required for the coupling reaction may be added to the reaction mixture as relatively pure oxygen or as an oxygen-containing gas mixture. This oxygen or oxygen-containing gas mixture may be purged with the aid of an inert gas, e.g., nitrogen or argon.

The oxygen required for the coupling reaction may be adjusted so that when the desired degree of polymerization is reached, practically the entire amount of oxygen has been consumed.

The hydrazine or hydrazinic (hydrazine-containing) solution may be added to the reaction mixture at a temperature of from about 20° to 100° C., preferably 40° to 70° C.

The molar ratio between the added hydrazine and the copper is between 1:1 and 10:1, preferably between 2:1 and 5:1.

The $C_6$ to $C_8$ aromatic solvent may be benzene, halogenated benzene, toluene, ortho-xylene, meta-xylene, para-xylene, ethyl benzene, pyridine or mixtures thereof.

The reaction medium employed may be comprised of a mixture of at least one of these aromative solvents and aliphatic alcohols or ketones with 1 to 6 carbon atoms in a volume ratio of from 92.5:7.5 to 50:50.

For example, a solvent mixture comprised of toluene and methanol may be employed.

The oxidative coupling may be carried out in a continuous system. It may also be carried out in a batchwise manner.

The method of this invention may also be run with a regulator added to the di-ortho-substituted phenol. The regulator has in its 4-position, an alkyl group with 1 to 4 carbon atoms. The regulator may be added in an amount of 0.05 to 1 mole percent based on the moles of the phenol to be polymerized. With the method of this invention the resulting precipitate may be reused along with a suitable amine and possibly some fresh copper salt. Thus the resulting precipitate may be used as the catalyst for a subsequent oxidative coupling reaction.

Polymerization methods for preparing polyphenylene ether are described e.g., in German OS Nos. 32 24 691 and 32 24 692. For experimental details, reference should be made to these documents and the literature cited therein.

As di-ortho-substituted phenols, either 2,6-diphenylphenol or 2,6-di-n-alkylphenols (with 1 to 6 C atoms in the alkyl group) are employed. 2,6-Dimethylphenol is preferred.

The catalyst used for the polycondensation may be a complex comprised of a copper salt (e.g. cupric bromide) and an aliphatic amine (e.g. n-dibutylamine, diethylamine, or triisopropylamine) or morpholine (see U.S. Pat. Nos. 3,306,874 and 3,306,875). The precipitate recovered at the end of the polycondensation may be advantageously reused according to the invention. As seen from Examples 8 and 9 infra, the catalyst recovered from said precipitate shows no loss of activity compared to fresh catalyst. It is obvious that a mixture of the precipitate and fresh copper salts, along with the amine, may be employed.

The reaction medium may be comprised of a $C_1$ to $C_4$ chlorinated hydrocarbon (e.g., dichloromethane, chloroform, or dichloroethane) or a $C_6$ to $C_8$ aromatic solvent (e.g., chlorobenzene, pyridine, or particularly toluene). Preferably the medium is comprised of a mixture of these chlorinated hydrocarbons or aromatic solvents with a $C_1$ to $C_6$ alcohol or ketone. These mixtures may be in a volume ratio of from 92.5:7.5 to 50:50, with the added constraint that the polyphenylene ether remain substantially dissolved. The preferred solvent is a mixture of methanol and toluene.

The desired degree of polymerization can be obtained by various means. For example, known physical chemical measuring techniques may be used to monitor the degree of polymerization—techniques such as viscosity determination. Alternatively one may simply empirically set the reaction time. The minimum possible amount of oxygen should be present in the gas and liquid spaces when the hydrazine is added. Advantageously, this condition is satisfied by purging any residual oxygen, or oxygen-containing reaction gas, with an inert gas such as nitrogen, argon or a mixture thereof. It is also possible to control the required amount of oxygen for the reaction, such that when the desired degree of polymerization is reached practically the entire amount of oxygen has been consumed. The hydrazine may be added pure or in aqueous or alcoholic solution. Particularly suitable alcoholic solvents for the hydrazine are methanol and ethanol. Preferably, the hydrazine solutions should contain at least about 10 wt. % hydrazine. Dilute aqueous hydrazine solutions are to be avoided, since addition of these can lead to the formation of two organic phases. The hydrazine is added preferably in an amount of up to 10 mol per 1 mol of copper compound in the reaction mixture.

The conversion with the hydrazine or hydrazine solution is carried out at from 20° to 100° C., preferably between 40° and 70° C. In a preferred embodiment, the desired amount of hydrazine is added first to the reaction mixture, then the resulting mixture is heated to a temperature between 40° and 70° C. and maintained at this temperature for 10 to 20 min. The mixture is then centrifuged to separate out the resulting copper-containing precipitate.

Separation of the precipitate may be, e.g., by simple filtration, or may involve use of a centrifuge, a separator, a decanter or other method known in this art.

In batch preparation of the polyphenylene ether, the polycondensation is terminated at the desired degree of conversion by purging the oxygen-containing reaction gas. The hydrazine is then added, and the reaction mixture is brought to the desired temperature. After 1 to 30 min, the copper-containing precipitate is removed, e.g. by centrifuging.

In an oxidative coupling reaction carried out in a continuous system, e.g. according to one process of German Patent Application No. P 34 05 629.7, the output of the final reaction stage can be preferably fed directly into a suitable mixing unit with hydrazine and brought to the desired temperature if the oxygen content of the liquid phase can be reduced to less than 0.006 mol/liter by appropriate control of the oxygen feed. The copper-containing precipitate can then be separated out in a continuously operating apparatus such as a separator or a solid-walled decanter.

In the case of continuous operation, it is advisable to add 0.05 to 1 mol. % of a regulator per mole of di-ortho-substituted phenol added. Suitable regulators are, e.g., derivatives of the di-ortho-substituted phenols having as a substituent in the 4-position $C_1$ to $C_4$ alkyl group. An example of such a regulator is 2,6-dimethyl-4-t-butylphenol.

The further processing of the resulting solutions (i.e., supernatant, filtrate, or the like) is not critical. Known prior art methods may be employed. When precipitation is effected by addition of so-called anti-solvents, or when one of the direct isolation methods is employed (e.g. hot water comminution), the resulting solution can be reused directly. However, in any case where directly concentrated solutions or melts are generated, it is recommended that the polyphenylene ether solution be washed with water before the actual concentration is carried out. The usual stabilizers, of the type used, e.g., in the preparation of polyphenylene ether-polystyrene mixtures (e.g., organic phosphites and/or other antioxidants, uv stabilizers, plasticizers, and flameproofing agents) (see German Pat. No. 1,694,257 and German OS No. 21 19 301) can be added.

Other features of the invention will become aparent in the course of the following description of exemplary embodiments which are given for illustration of the invention and are not intended to be limiting thereof.

The "J" value given in the Examples, infra, is the relative viscosity change between a 0.5 wt. % solution of the polymer in chloroform at 25° C. and the pure (chloroform) solvent, according to DIN 53 728.

EXAMPLE 1

For preparation of the catalyst, 1.95 g $CuCO_3.Cu(OH)_2$ was dissolved in 5.7 g of 48% hydrobromic acid, and 30 g of morpholine was added to the resulting homogeneous solution under stirring.

For the preparation of poly(2,6-dimethyl-1,4-phenylene ether), the above prepared catalyst solution was combined in a 3 liter agitated reactor with a mixture of 1,300 g toluene and 207 g methanol. 30 g of a 50 wt. % solution of 2,6-dimethylphenol in toluene was added, and the polycondensation was started under stirring at 750 rpm by introducing a 200 liter/hr stream of air. The reaction temperature was maintained at 30° C. After 10 min an additional 270 g of the 50% solution of 2,6-dimethylphenol in toluene was added dropwise over a period of 30 min. Then, 30 min after the last addition of the phenol, the air stream was replaced by a 100 liter/hr stream of nitrogen. After 5 min of the nitrogen purge, 4.7 g hydrazine hydrate ($N_2H_4.H_2O$) was stirred in, and the reaction mixture was heated to 45° C. Then, 10 min after addition of the hydrazine hydrate, the copper-containing precipitate was centrifuged out. The polymer was recovered by the addition of 1,500 g methanol to the supernatant.

| Parameters of the polymer: | |
|---|---|
| J-value | 55 ml/g. |
| quinone content | <20 ppm. |
| Copper content | <2 ppm. |

If the polymer solution is washed with water at 60° C. after removal of the copper-containing precipitate, the J value of the polyphenylene ether stays constant.

EXAMPLE 2

In the apparatus of Example 1, the catalyst solution of Example 1 was combined with a mixture of 1,490 g toluene and 166 g methanol. 30 g of a 50 wt. % solution of 2,6-dimethylphenol ("DMP") in toluene was added, and the polycondensation was started under stirring at 750 rpm by introducing a 200 liter/hr stream of air. The reaction temperature was kept constant at 30° C.±1° C., as in Example 1. After 10 min an additional 270 g of the 50% solution of DMP in toluene was added dropwise over a period of 30 min. Then, 35 min after the last addition of the phenol, the air stream was replaced by a 100 liter/hr stream of nitrogen. After 5 min of nitrogen purge, a solution of 1.87 g hydrazine in 10 g methanol was stirred in, the reaction mixture was heated to 55° C. and stirred 10 min at 55° C. The copper-containing precipitate was then centrifuged out, and the polymer was recovered from the organic phase by addition of 1,500 g methanol.

| Parameters of the polymer: | |
|---|---|
| J-value | 55 ml/g. |
| quinone content (measured as uv-absorption at 420 nm in a 1% solution, after removal of the copper-containing precipitate): | <0.2 mg/liter |
| Quinone content (in the precipitated product) | <20 ppm. |
| Copper content | <2 ppm. |

EXAMPLE 3

The procedure was as in Example 1, but 170 g 2,6-diethylphenol was employed instead of the 150 g DMP.

| Parameters of the polymer: | |
|---|---|
| J-value | 52 ml/g. |
| quinone content | <20 ppm. |
| Copper content | <2 ppm. |

EXAMPLE 4

The procedure was as in Example 1, except as follows:

The 5-min nitrogen purge was begun 15 min after the last addition of the phenol. Thereafter, the reaction mixture was divided into two parts.

The first aliquot was mixed with 2.9 g hydrazine hydrate and allowed to sit under a nitrogen atmosphere. A copper-containing precipitate separated out. After 8 hr, the J-value of the polymer was determined (Table 1). After 24 hr, air was introduced, whereupon the polymer solution, which had been virtually colorless after the hydrazine treatment, acquired substantial color. After an interval, samples were taken for J-value determination. After 60 min, the copper-containing precipitate was completely dissolved (Table 2).

TABLE 1

| Constancy of the J-value when the reaction mixture was treated with hydrazine under nitrogen. | | | | |
|---|---|---|---|---|
| | t = 0 hr | t = 8 hr | t = 16 hr | t = 24 hr |
| J-values (ml/g) | 19 | 19 | 19 | 19 |

TABLE 2

| Increase in the J-value and dissolution of the precipitate in the presence of oxygen, accompanied by quinone formation | | | | |
|---|---|---|---|---|
| | t = 0 | t = 15 min | t = 30 min | t = 60 min |
| J-value (ml/g) | 19 | 40 | 65 | >100 |
| Quinone content (ml/liter) | 1 | ca. 20 | 40 | 60 |

The second aliquot was allowed to condense for an additional 15 min, and then was subjected to the same treatment and measurement as the first aliquot (see Tables 3 and 4).

TABLE 3

| Constancy of the J-value when the reaction mixture of the second aliquot was treated with hydrazine under nitrogen. | | | | |
|---|---|---|---|---|
| | t = 0 hr | t = 8 hr | t = 16 hr | t = 24 hr |
| J-values (ml/g) | 54 | 53 | 54 | 54 |

TABLE 4

| Same format as Table 2, but for the second aliquot. | | | | |
|---|---|---|---|---|
| | t = 0 | t = 15 min | t = 30 min | t = 60 min |
| J-value (ml/g) | 54 | 57 | 63 | 70 |
| Quinone content (ml/liter) | 1 | 20 | 32 | 40 |

EXAMPLE 5

The procedure was the same as in Example 1, except that the reaction solvent employed was a mixture of 1,300 g chloroform and 207 g methanol, and the DMP was furnished dissolved in chloroform (50 wt. % solution).

| Parameters of the polymer: | |
|---|---|
| J-value | 35 ml/g. |
| quinone content | <20 ppm. |
| Copper content | <2 ppm. |

EXAMPLE 6

The procedure was the same as in Example 1, except that the reaction solvent employed was 1,500 g dichloromethane, the DMP was furnished dissolved in dichloromethane (50 wt. % solution), and the time of the second stage reaction was reduced to 20 min.

| Parameters of the polymer: | |
|---|---|
| J-value | 35 ml/g. |
| quinone content | <20 ppm. |
| Copper content | <2 ppm. |

EXAMPLE 7

800 ml toluene, 2.0 g cupric chloride, 200 g morpholine, and 5 g morpholinium bromide were mixed in a 2 liter agitated reactor. Then 100 g DMP dissolved in 100 g toluene was added, along with 4 g of a 50% NaOH solution, and air was fed through at 200 liter/hr via a gas bubbling tube, wherewith the polymerization was begun. The temperature of the reaction mixture was kept between 30° and 35° C. After 90 min, the air stream was replaced by a stream of nitrogen at 100 liter/hr. After 5 min of purging with the inert gas, 3.2 g hydrazine hydrate was stirred in, and the reaction mixture was heated to 45° C. Thereafter the remainder of the procedure corresponded to that of Example 1.

| Parameters of the polymer: | |
|---|---|
| J-value | 58 ml/g. |
| quinone content | <20 ppm. |
| Copper content | <2 ppm. |

EXAMPLE 8

A mixture of 1,300 g toluene, 207 g methanol, and 30 g morpholine was charged to the apparatus described in Example 1, the precipitate isolated in Example 1 (3.8 g after drying) was added, along with 30 g of a 50 wt. % solution of DMP in toluene, and the polycondensation was started under stirring by introducing an air stream of 200 liter/hr. Five minutes after the beginning of the air supply, the originally insoluble copper complex had dissolved. After an additional 5 min, an additional 270 g of the 50% solution of 2,6-dimethylphenol in toluene was added dropwise over a period of 30 min, as in Example 1. The remainder of the process thereafter corresponded to that in Example 1.

| Parameters of the polymer: | |
|---|---|
| J-value | 54 ml/g. |
| quinone content | <20 ppm. |
| Copper content | <2 ppm. |

EXAMPLE 9

Using the isolated copper-containing precipitate from Example 8 (3.6 g after drying) as the catalyst, the procedure for polycondensation of 2,6-dimethylphenol was run through anew (with a new batch of feedstock) according to Example 8.

EXAMPLE A (Comparison Example)

The procedure was the same as in Example 1, except that the hydrazine hydrate was fed along with the 2,6-dimethylphenol (i.e., with the same timing and at the same percentage rate). There was no hindrance of the polycondensation. No copper-containing precipitate was observed to form.

EXAMPLE B (Corresponding to German OS No. 26 16 746)

The procedure was the same as in Example 1, except that after the nitrogen purge a solution of 10 g ethylenediamine tetraacetic acid disodium salt (EDTA) and 4.7 g hydrazine hydrate in 150 ml water was stirred in. Following phase separation, the polymer was isolated by precipitation with methanol. All the copper ended up in dissolved form in the aqueous phase.

| Parameters of the polymer: | |
|---|---|
| J-value | 35 ml/g. |
| quinone content (measured as uv-absorption at 420 nm, after phase separation): | <0.2 mg/l |
| quinone content | <20 ppm. |
| Copper content | <2 ppm. |

Accordingly, an object of the present invention, namely avoidance of the need to carry out separation of aqueous dissolved copper, is not achieved.

EXAMPLE C (Corresponding to German Pat. No. 24 30 130)

The procedure was the same as in Example 1, except that the hydrazine was added by stirring in a solution of 5.8 g hydroquinone and 8.82 g hydrazine hydrate in 200 ml water. After separation out of the precipitate and phase separation, the polymer solution was washed with another 200 ml water.

| Parameters of the polymer: | |
|---|---|
| J-value | 55 ml/g. |
| quinone content of the washed solution | 48 mg/liter |

The polymer solution was concentrated to a solids content of 50%, yielding a dark brown melt unsuitable for producing qualitatively high quality polymer mixtures based on polyphenylene ethers and high impact polystyrene. In contrast, the color of the 50% melts obtained according to Example 1 was only a pale yellow.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for producing a polyphenylene ether which comprises:
(1) oxidatively coupling a di-ortho-substituted phenol in the presence of a copper catalyst in a medium which comprises:
   (a) a $C_1$ to $C_4$ chlorinated hydrocarbon;
   (b) a $C_6$ to $C_8$ aromatic solvent; or
   (c) a mixture of (a) or (b) and a $C_1$ to $C_6$ alcohol, a $C_3$ to $C_6$ ketone or a mixture thereof, in a volumetric ratio of from 92.5:7.5 to 50:50, wherein during the oxidative coupling reaction the polyphenylene ether substantially remains in solution;
(2) removing the oxygen required for the coupling reaction;
(3) terminating the reaction by adding hydrazine to the reaction mixture; and,
(4) separating out the resulting precipitate.

2. The method of claim 1, wherein the hydrazine is added as a hydrazine solution.

3. The method of claim 1, wherein the oxygen required for the coupling reaction is provided as oxygen or as an oxygen-containing reaction gas.

4. The method of claim 1, wherein the oxygen required for the coupling reaction is purged from the reaction mixture with the aid of an inert gas.

5. The method of claim 4, wherein the inert gas comprises nitrogen or argon.

6. The method of claim 1, wherein the amount of oxygen required for the coupling reaction is adjusted so that when a desired degree of polymerization is reached practically the entire amount of oxygen has been consumed.

7. The method of claim 1, wherein the hydrazine is added to the reaction mixture at a temperature of from 20° to 100° C.

8. The method of claim 7, wherein the temperature is from 40° to 70° C.

9. The method of claim 1, wherein hydrazine is added in a molar ratio of between 1:1 and 10:1 relative to copper used.

10. The method of claim 9, wherein the molar ratio is between 2:1 and 5:1.

11. The method of claim 1, wherein the di-ortho-substituted phenol comprises 2,6-dimethylphenol.

12. The method of claim 1, wherein the reaction medium comprises a mixture of an aromatic solvent and methanol or ethanol in a volumetric ratio of from 92.5:7.5 to 50:50.

13. The method of claim 12, wherein the reaction medium comprises toluene and methanol.

14. The method of claim 1, wherein the oxidative coupling reaction is carried out in a continuous system.

15. The method of claim 1, wherein the oxidative coupling reaction is carried out in a batch-wise manner.

16. The method of claim 14, wherein a regulator is added.

17. The method of claim 16, wherein the regulator comprises a di-ortho-substituted phenol having, at its 4-position, a $C_1$ to $C_4$ alkyl group.

18. The method of claim 17, wherein the regulator is added in an amount of from 0.05 to 1 mole percent based on 1 mole of the phenol to be polymerized.

19. The method of claim 1, wherein the precipitate is combined with a suitable amine and used in a subsequent oxidative coupling reaction.

20. The method of claim 19, wherein a fresh copper salt is added to the precipitate.

21. The method of claim 2, wherein a hydrazine solution containing at least 10 wt. % hydrazine is used.

* * * * *